US005906905A

United States Patent [19]

Malhotra

[11] Patent Number: 5,906,905

[45] Date of Patent: May 25, 1999

[54] SIMULATED PHOTOGRAPHIC-QUALITY PRINTS USING A TRANSPARENT SUBSTRATE CONTAINING A WRONG READING IMAGE AND A BACKING SHEET CONTAINING AN ULTRAVIOLET LIGHT ABSORBER

[75] Inventor: Shadi L. Malhotra, Ontario, Canada

[73] Assignee: Xerox Corporation, Stamford, Conn.

[21] Appl. No.: 08/585,083

[22] Filed: Jan. 11, 1996

[51] Int. Cl.$^{6}$ .......... G03G 13/20; B32B 31/12

[52] U.S. Cl. .......... 430/97; 430/13; 430/14; 430/18; 428/207; 156/230; 156/241; 156/277

[58] Field of Search .......... 430/13, 14, 18, 430/97; 156/230, 240, 241, 277; 428/207

[56] References Cited

U.S. PATENT DOCUMENTS

| | | | |
|---|---|---|---|
| 3,488,189 | 1/1970 | Mayer et al. | 96/1.5 |
| 3,561,337 | 2/1971 | Mulkey | 95/1 |
| 3,914,097 | 10/1975 | Wurl | 432/59 |
| 4,066,802 | 1/1978 | Clemens | 427/24 |
| 4,526,847 | 7/1985 | Walker et al. | 430/18 |
| 4,600,669 | 7/1986 | Ng et al. | 430/47 |
| 4,686,163 | 8/1987 | Ng et al. | 430/47 |
| 4,724,026 | 2/1988 | Nelson | 156/23.3 |
| 4,868,049 | 9/1989 | Nelson | 428/328 |
| 4,956,225 | 9/1990 | Malhotra | 428/216 |
| 4,997,697 | 3/1991 | Malhotra | 428/195 |
| 5,065,183 | 11/1991 | Morofuji | 355/202 |
| 5,108,865 | 4/1992 | Zrwaldo et al. | 430/126 |
| 5,118,570 | 6/1992 | Malhotra | 428/474.4 |
| 5,126,797 | 6/1992 | Forest | 355/278 |
| 5,202,205 | 4/1993 | Malhotra | 430/17 |
| 5,244,714 | 9/1993 | Malhotra et al. | 428/195 |
| 5,302,439 | 4/1994 | Malhotra | 428/195 |
| 5,314,747 | 5/1994 | Malhotra et al. | 428/341 |
| 5,327,201 | 7/1994 | Coleman et al. | 355/278 |
| 5,337,132 | 8/1994 | Cherian | 355/278 |
| 5,342,685 | 8/1994 | Gobran | 428/355 |
| 5,346,766 | 9/1994 | Otter et al. | 428/355 |
| 5,352,530 | 10/1994 | Tanuma et al. | 428/442 |
| 5,378,536 | 1/1995 | Miller et al. | 428/355 |
| 5,413,840 | 5/1995 | Mizuno | 428/195 |
| 5,418,208 | 5/1995 | Takeda et al. | 503/227 |

OTHER PUBLICATIONS

South African Patent Application; 924,610.

Websters II, New Riverside University Dictionary, p. 885 (1988).

*Primary Examiner*—Bernard Codd
*Attorney, Agent, or Firm*—Zosan S. Soong

[57] ABSTRACT

Simulated photographic-quality prints are created using non-photographic imaging such as xerography and ink jet. Reverse reading toner images are formed on a transparent substrate which is adhered to a coated backing sheet. The backing sheet is coated with a lightfastness material for minimizing degradation of color images exposed to UV light.

3 Claims, 2 Drawing Sheets

SIMULATED PHOTOGRAPHIC-QUALITY PRINTS USING A TRANSPARENT SUBSTRATE CONTAINING A WRONG READING IMAGE AND A BACKING SHEET CONTAINING AN ULTRAVIOLET LIGHT ABSORBER

BACKGROUND OF THE INVENTION

The present invention is directed to creating simulated, photographic-quality prints and substrates suitable for use in creating simulated photographic-quality images or prints using imaging such as xerography and/or ink jet printing and/or copying. More specifically, the present invention is directed to creating simulated, photographic-quality prints which resist color degradation due to Ultra Violet (UV) light.

In the practice of conventional xerography, it is the general procedure to form electrostatic latent images on a xerographic surface by first uniformly charging a charge retentive surface such as a photoreceptor. The charged area is selectively dissipated in accordance with a pattern of activating radiation corresponding to original images. The selective dissipation of the charge leaves a latent charge pattern on the imaging surface corresponding to the areas not exposed by radiation.

This charge pattern is made visible by developing it with toner by passing the photoreceptor past one or more developer housings. In monochromatic imaging, the toner generally comprises black thermoplastic powder particles which adhere to the charge pattern by electrostatic attraction. The developed image is then fixed to the imaging surface or is transferred to a receiving substrate such as plain paper to which it is fixed by suitable fusing techniques.

Recently, there has been a great deal of effort directed to the development of color copiers/printers which utilize the xerographic and/or ink jet imaging process. Such efforts have resulted in the introduction of the Xerox™ 5775™ copier/printer, the Xerox 4900™ and the Fuji Xerox A-Color 635™ machine into the market place.

Notwithstanding all the recent development in the area of color printers and copiers there is room for improvement in the quality of color images on paper and synthetic substrates such as Mylar™ and Teslin™. The foregoing is particularly true when trying to create photographic-quality images using non photographic processes.

Attempts at improving conventionally formed color toner images have led to the lamination of xerographic images on paper using a transparent substrate. This procedure has been only partially successful because the lamination process tends to reduce the density range of the print resulting in a print that has less shadow detail. The lamination process also adds significant weight and thickness to the print.

Additionally, it is believed that the aforementioned lamination process doesn't produce good results because typically the color toner images at the interface between the laminate and the toner do not make suitable optical contact. That is to say, the initially irregular toner image at the interface is still irregular (i.e. contains voids) enough after lamination that light is reflected from at least some of those surfaces and is precluded from passing through the toner. In other words, when there are voids between the transparency and toner image, light gets scattered and reflected back without passing through the colored toner. Loss of image contrast results when any white light is scattered, either from the bottom surface of the transparent substrate or from the irregular toner surfaces and doesn't pass through the toner.

A known method of improving the appearance of color xerographic images on a transparent substrate comprises refusing the color images. Such a process was observed at a NOMDA trade show in 1985 at a Panasonic exhibit. The process exhibited was carried out using an off-line transparency fuser, available from Panasonic as model FA-F100, in connection with a color xerographic copier which was utilized for creating multi-color toner images on a transparent substrate for the purpose of producing colored slides. Since the finished image from the color copier was not really suitable for projection, it was refused using the aforementioned off-line refuser. To implement the process, the transparency is placed in a holder intermediate which consists of a clear relatively thin sheet of plastic and a more sturdy support. The holder is used for transporting the imaged transparency through the off-line refuser. The thin clear sheet is laid on top of the toner layer on the transparency. After passing out of the refuser, the transparency is removed from the holder. This process resulted in an attractive high gloss image useful in image projectors. The refuser was also used during the exhibit for refusing color images on paper. However, the gloss is image-dependent. Thus, the gloss is high in areas of high toner density because the toner refuses in contact with the clear plastic sheet and becomes very smooth. In areas where there is little or no toner the gloss is only that of the substrate. The refuser was also used during the exhibit for refusing color images on paper.

Following is a discussion of additional prior art which may bear on the patentability of the present invention. In addition to possibly having some relevance to the question of patentability, these references, together with the detailed description to follow, should provide a better understanding and appreciation of the present invention. The prior art discussed herein as well as the prior art cited therein is incorporated herein by reference.

U.S. Pat. Nos. 5,327,201 and 5,337,132 granted to Robert E. Coleman on Jul. 5, 1994 and to Abraham Cherian on Aug. 9, 1994, respectively, disclose the creation of simulated photographic prints using xerography. To this end, reverse reading images are formed on a transparent substrate and backing sheet is adhered to the transparent substrate. U.S. patent applications Nos. 08/095,639, 08/095,622, 08/095,016, 08/095,136 and 08/095,639 cited in the '132 patent are also incorporated herein by reference.

Protective sheets used in various printing and imaging processes are well known. For example, U.S. Pat. No. 5,418,208 (Takeda and Kawashima) discloses a laminated plastic card providing a lamination of a dye accepting layer, a substrate of paper or the like, and a back coat layer on which lamination one or more patterns are printed with a volatile dye, and a transparent plastic film adhered on the lamination by an adhesive agent, wherein the adhesive agent is a saturated polyester having an average molecular weight of 18,000 gm/mole and produced by condensation polymerization of polypropylene glycol or trimethylol propane and adipic acid or azelaic acid.

U.S. Pat. No. 5,413,840 (Mizuno) discloses a decorative laminated sheet having a sense of being coated and having improved surface hardness, which is produced by laminating a polyester film excellent in transparency on the surface of a semi-rigid thermoplastic resin film supplied with a colored layer or a pattern-printed layer, and then coating a hard coat layer comprising a UV-curable coating on the surface of the polyester film of the resulting laminated film, and a process for producing the same. This invention can provide a sheet not only excellent in scratch resistance, specular reflectivity and sharpness of the surface, but having a sense of being deeply coated as well.

U.S. Pat. No. 5,378,536 (Miller and Clements) discloses a repositionable adhesive tape where an adhesive of certain elastomeric block copolymers and tackifying materials can be hot-melt coated on to a flexible backing to provide an adhesive tape, two pieces of which can bond to each other to have excellent resistance to shear forces but can be easily peeled apart, even after prolonged periods of time. The adhesive can be low-tack or tack-free. When the novel adhesive is tacky, it can bind sheets into a note pad from which individual sheets can be removed, temporarily adhered to paper and other substrates, and later cleanly removed, even after prolonged contact.

U.S. Pat. No. 5,352,530 (Tanuma et.al) discloses a highly transparent film having high strength, suitable extensibility, high weather resistance, low moisture absorption, which consists mainly of ethylene-vinylacetate copolymer. Various laminates making the most of the above properties of the film are disclosed, which comprise the ethylene-vinylacetate copolymer interposed between two inorganic material sheets, two organic material sheets, or an inorganic material sheet and an organic material sheet.

U.S. Pat. No. 5,346,766 (Otter and Watts) discloses a positionable-repositionable pressure sensitive adhesive that may be repeatedly applied to a surface and removed during an initial installation time period. The adhesive contains an adhesive base resin and coacting detackifying resin and particulate components which temporarily reduce the tack and peel strength of the adhesive. Upon passage of time and/or application of thermal energy, adhesion build-up occurs to a maximum value. The pressure-sensitive adhesive may be used as an adhesive layer in a laminate for tapes, # signs and decorative and protective applications including vehicle marking and architectural installations.

U.S. Pat. No. 5,342,685 (Gobran) discloses a hot melt coatable pressure-sensitive adhesive showing high levels of adhesion to low surface energy films and nonwovens. The adhesive elastomeric phase comprises from 78 to 98 parts by weight of a diblock A-B type block copolymer with an elastomeric block of 1,3-polybutadiene with 2 to 22 parts by weight of multiblock A-B type block copolymer. The tackifying material comprises 140 parts or less of a solid tackifying resin and a liquid tackifier to provide an adhesive having a composite midblock glass transition of −10° C.

U.S. Pat. No. 5,118,570 (Malhotra) and U.S. Pat. No. 5,006,407 (Malhotra), the disclosures of each of which are totally incorporated herein by reference, disclose a transparency which comprises a hydrophilic coating and a plasticizer, which plasticizer can, for example, be from the group consisting of phosphates, substituted phthalic anhydrides, glycerols, glycols, substituted glycerols, pyrrolidinones, alkylene carbonates, sulfolanes, and stearic acid derivatives.

U.S. Pat. No. 4,526,847 (Walker et al.) discloses a transparency for the formation of an adherent electrostatic image thereon which includes a polyester resin film sheet having an image-receiving coating of nitrocellulose, a plasticizer, a particulate material, and, preferably, an antistatic agent. The coating is applied to the film sheet from a solvent mixture of an aliphatic ester or an aliphatic ketone, and an aliphatic alcohol.

U.S. Pat. No. 3,561,337 (Mulkey) discloses a sheet material having a transparent backing coated with a layer containing a polymeric binder and particles of solid material which is insoluble in the binder. The refractive index of the solid material varies from that of the binder by at most ±0.6. The surface of the layer is ink receptive and, by printing on that surface, a transparency is obtained.

U.S. Pat. No. 3,488,189 (Mayer et al.) discloses the formation of fused toner images on an imaging surface corresponding to an electrostatic field by depositing on the imaging surface in image configuration toner particles containing a thermoplastic resin, the imaging surface carrying a solid crystalline plasticizer having a lower melting point than the melting range of the thermoplastic resin and heat fusing the resulting toner image.

U.S. Pat. No. 4,956,225 (Malhotra) discloses a transparency suitable for electrographic and xerographic imaging which comprises a polymeric substrate with a toner receptive coating on one surface. Also disclosed are transparencies with first and second coating layers.

U.S. Pat. No. 4,997,697 (Malhotra) discloses a transparent substrate material for receiving or containing an image which comprises a supporting substrate base, an antistatic polymer layer coated on one or both sides of the substrate and comprising hydrophilic cellulosic components, and a toner receiving polymer layer contained on one or both sides of the antistatic layer, which polymer comprises hydrophobic cellulose ethers, hydrophobic cellulose esters, or mixtures thereof, and wherein the toner receiving layer contains adhesive components.

U.S. Pat. No. 5,202,205 (Malhotra), discloses a transparent substrate material for receiving or containing an image comprising a supporting substrate, an ink toner receiving coating composition on both sides of the substrate and comprising an adhesive layer and an antistatic layer contained on two surfaces of the adhesive layer, which antistatic layer comprises mixtures or complexes of metal halides or urea compounds both with polymers containing oxyalkylene segments.

U.S. Pat. No. 5,244,714 (Malhotra et al.), discloses a recording sheet which comprises a base sheet, an antistatic layer coated on at least one surface of the base sheet comprising a mixture of a first component selected from the group consisting of hydrophilic polysaccharides and a second component selected from the group consisting of poly (vinyl amines), poly (vinyl phosphates), poly (vinyl alcohols), poly (vinyl alcohol)-ethoxylated, poly (ethylene imine)-ethoxylated, poly (ethylene oxides), poly (n-vinyl acetamide-vinyl sulfonate salts), melamine-formaldehyde resins, urea-formaldehyde resins, styrene-vinylpyrrolidone copolymers, and mixtures thereof, and at least one toner receiving layer coated on an antistatic layer comprising a material selected from the group consisting of maleic anhydride containing polymers, maleic ester containing polymers, and mixtures thereof.

U.S. Pat. No. 5,302,439 entitled "Recording Sheets" with the named inventors Shadi L. Malhotra and Brent S. Bryant, discloses a recording sheet which comprises (a) a substrate; (b) a coating on the substrate which comprises a binder and a material having a melting point of less than about 65° C and a boiling point of greater than 150° C. and selected from the group consisting of alkyl phenones, alkyl ketones, halogenated alkanes, alkyl amines, alkyl anilines, alkyl diamines, alkyl alcohols, alkyl diols, halogenated alkyl alcohols, alkane alkyl esters, saturated fatty acids, unsaturated fatty acids, alkyl aldehydes, alkyl anhydrides, alkanes, and mixtures thereof; (c) an optional traction agent; and (d) an optional antistatic agent.

U.S. Pat. No. 5,451, 466 entitled "Recording Sheets" with the named inventor Shadi L. Malhotra, discloses a recording sheet which comprises (a) a substrate; (b) a coating on the substrate which comprises (i) a binder selected from the group consisting of (A) copolymers of styrene and at least one other monomer; (B) copolymers of acrylic monomers and at least one other monomer; and (C) mixtures thereof; and (ii) an additive having a melting point of less than about 65° C. and a boiling point of more than about 150° C. and selected from the group consisting of (A) diphenyl compounds; (B) phenyl alkanes; (C) indan compounds; (D) benzene derivatives; (E) benzyl alcohols; (F) phenyl alcohols; (G) menthol; (H) aromatic amines; and (I) mixtures thereof; (c) an optional filler; (d) an optional antistatic agent; and (e) an optional biocide. Also disclosed is a process for generating images which comprises (1) generating an electrostatic latent image on an imaging member in an imaging apparatus; (2) developing the latent image with a toner which comprises a colorant and a resin selected from the group consisting of (A) copolymers of styrene and at least one other monomer; (B) copolymers containing acrylic monomers and at least one other monomer; and (C) mixtures thereof; and (3) transferring the developed image to a recording sheet which comprises (a) a substrate; (b) a coating on the substrate which comprises (i) a polymeric binder selected from the group consisting of (A) copolymers of styrene and at least one other monomer; (B) copolymers of acrylic monomers and at least one other monomer; and (C) mixtures thereof; and (ii) an additive having a melting point of less than about 65° C. and a boiling point of more than about 150° C. and selected from the group consisting of (A) diphenyl compounds; (B) phenyl alkanes; (C) indan compounds; (D) benzene derivatives; (E) benzyl alcohols; (F) phenyl alcohols; (G) menthol; (H) aromatic amines; (I) aliphatic amines; (J) aldehydes; (K) aldehyde derivatives; and (L) mixtures thereof; (c) an optional filler; (d) an optional antistatic agent; and (e) an optional biocide.

South African Patent Application 924,610 discloses a transparent recording sheet suitable for making visual transparencies which comprises a thin transparent film backing bearing on at least one major surface thereof an ink jet receptive layer comprising from 1% to 10% of at least one acid having a pKa of from 2 to 6, said acid being selected from the group consisting of aryl monocarboxylic acids, aryloxy monocarboxylic acids, alkyl carboxylic acids having alkyl groups containing at least 11 carbon atoms, dicarboxylic acids, tricarboxylic acids, and pyridinium salts, and at least one liquid-absorbent polymer comprising from 90% to 99% aprotic constituents, wherein said sheet shows reduced fading when imaged with an ink containing triarylmethane dye and at least one nucleophile over an identical composition containing no protic organic-solvent-soluble additive.

U.S. Pat. No. 5,500,668 with the named inventors Shadi L. Malhotra, Kurt B. Gundlach, and Richard L. Colt, filed concurrently herewith, entitled “Recording Sheets for Printing Processes Using Microwave Drying” discloses a printing process which comprises (a) providing a recording sheet which comprises a substrate, at least one monomeric salt, an optional binder, an optional antistatic agent, an optional biocide, and an optional filler; (b) applying an aqueous recording liquid to the recording sheet in an imagewise pattern; and (c) thereafter exposing the substrate to microwave radiation, thereby drying the recording liquid on the recording sheet.

Copending application U.S. Ser. No. 08/196,922 (Attorney Docket No. D/93594), with the named inventor Shadi L. Malhotra, filed concurrently herewith, entitled “Recording Sheets Containing Alcohols and Saccharides” discloses a recording sheet which comprises a substrate and a material selected from the group consisting of monosaccharides, oligosaccharides, and mixtures thereof, thereby drying the recording liquid on the recording sheet.

U.S. Pat. No. 5,589,277 with the named inventor Shadi L. Malhotra, filed concurrently herewith, entitled “Recording Sheets Containing Amino Acids, Hydroxy Acids, and Polycarboxyl Compounds” discloses a recording sheet which comprises a paper substrate and a material selected from the group consisting of monomeric amino acids, monomeric hydroxy acids, monomeric polycarboxyl compounds, and mixtures thereof. Another embodiment is directed to a recording sheet which comprises a substrate and an additive material selected from the group consisting of monomeric amino acids, monomeric hydroxy acids, and mixtures thereof.

Copending application U.S. Ser. No. 08/196,607 (Attorney Docket No. D/93598), with the named inventor Shadi L. Malhotra, filed concurrently herewith, entitled “Recording Sheets Containing Amine Salts and Quaternary Choline Halides” discloses a recording sheet which comprises a substrate and a material selected from the group consisting of monomeric amine acid salts, monomeric quaternary choline halides, and mixtures thereof.

Copending application U.S. Ser. No. 08/196,676 (Attorney Docket No. D/93599), with the named inventor Shadi L. Malhotra, filed concurrently herewith, entitled “Recording Sheets Containing Pyrrole, Pyrrolidine, Pyridine, Piperidine, Homopiperidine, Quinoline, Isoquinoline, Quinuclidine, Indole, and Indazole Compounds” discloses a recording sheet which comprises a substrate and an additive material selected from the group consisting of pyrrole compounds, pyrrolidine compounds, pyridine compounds, piperidine compounds, homopiperidine compounds, quinoline compounds, isoquinoline compounds, quinuclidine compounds, indole compounds, indazole compounds, and mixtures thereof.

Copending application U.S. Ser. No. 08/196,933 (Attorney Docket No. D/93600), with the named inventor Shadi L. Malhotra, filed concurrently herewith, entitled “Recording Sheets Containing Purine, Pyrimidine, Benzimidazole, Imidazolidine, Urazole, Pyrazole, Triazole, Benzotriazole, Tetrazole, and Pyrazine Compounds” discloses a recording sheet which comprises a substrate and a material selected from the group consisting of purine compounds, pyrimidine compounds, benzimidazole compounds, imidazolidine compounds, urazole compounds, pyrazole compounds, triazole compounds, benzotriazole compounds, tetrazole compounds, pyrazine compounds, and mixtures thereof. Also disclosed is a recording sheet which consists essentially of a substrate, at least one material selected from the group consisting of purine compounds, pyrimidine compounds, benzimidazole compounds, imidazolidine compounds, urazole compounds, pyrazole compounds, triazole compounds, benzotriazole compounds, tetrazole compounds, pyrazine compounds, and mixtures thereof, an optional binder, an optional antistatic agent, an optional biocide, and an optional filler.

U.S. Pat. No. 5,663,004 with the named inventors Shadi L. Malhotra, Brent S. Bryant, and Arthur Y. Jones, filed concurrently herewith, entitled “Recording Sheets Containing Mildew Preventing Agents” discloses a recording sheet which comprises a substrate, an image receiving coating, and a biocide.

U.S. Pat. Nos. 4,686,163 and 4,600,669 describe an electrophotographic imaging method that uses an element comprising a photoconductive layer on an electrically conducting substrate capable of transmitting actinic radiation to which the photoconductive layer is responsive, and a dielectric support, releasably adhered to the substrate, comprising the photoconductive layer or an overcoat thereof forming a surface of the element capable of holding an applied electrostatic charge. To use the element, the surface of the dielectric support is charged, and the photoconductive layer is imagewise-exposed to actinic radiation, thereby forming a developable electrostatic image on the dielectric surface. The electrostatic image, in turn, is developed with toner to form a first color image. A composite color image is formed on the element by repeating the sequence one or more times with imagewise exposure of the photoconductive layer to actinic radiation transmitted through the substrate, and developing over each preceding image with a different color toner. The composite tone image is transferred with the dielectric support to a receiving element to form a color copy such as a three-color filter array or a color proof closely simulating the color print expected from a full press run.

The dielectric support on the photoconductive layer comprised a transparent blend of (vinylacetate-co-crotonic acid, 95/5 mole ratio) and cellulose acetate butyrate. The resulting multicolor proof presented a multicolor toner image against a white paper background and protected by the overlying dielectric support, thus accurately resembling a multicolor print from a full press run.

The receiver element to which the dielectric support and composite toner image are transferred can be any suitable material against or through which the toner image is desired to be viewed. The receiver can be print stock, such as paper, upon which a press run will be conducted. The receiver can also be of transparent material such as a polymeric film. With respect to the latter, the invention also contemplates, as an embodiment, transfer of the composite toner image and dielectric support to image-bearing elements such as microfilm or microfiche so that the composite color image forms information in addition to image information already present on such image-bearing elements. In addition, the invention contemplates the use of transparent glass or non birefringent translucent polymeric materials such as cellulose esters for use as the receiver. Receivers manufactured from such materials are suited for use informing three-color filter arrays by the process described herein involving the formation of filter array matrices of the complementary colorants cyan, magenta and yellow in the respective color toner imaging steps. If desirable, the receiver can also contain a suitable overcoat layer adapted to soften under the influence of pressure and heat during the transfer step. In this manner, the adhesion of the dielectric support and composite toner image to the receiver can be enhanced.

The electrophotographic element bearing the multicolor toner image is moved to a separate lamination device comprising heated metal and rubber rolls, together forming a nip. The toner image is passed through the nip with and against a white receiver paper at a roll temperature of 100° C. (212° F.) and a pressure of 225 pounds per square inch to effect transfer of the dielectric support and composite image to the receiver followed by peeling off the rest of the electrophotographic element.

U.S. Pat. No. 4,066,802 granted on Jan. 3, 1978 to Carl F. Clemens discloses a method of decalcomania in which a toner image pattern is formed on a transfer member which has been overcoated with an adhesive material. A polymeric sheet is interposed between the toner image and a cloth or other image receiving medium. The polymeric sheet assists in the permanent adherence of the toner imaging pattern to the cloth material or other medium when the composite is subjected to heat and pressure. The transfer member and method of its use are set forth. Another embodiment discloses the use of a solvent to fix the image to a cloth material.

U.S. Pat. No. 5,065,183 granted on Nov. 12, 1991 to Morofuji et al. discloses a multicolor printing method for printing multicolor picture images upon a material or object to be printed comprises the steps of, in accordance with a first embodiment of the invention, the formation of a multicolor toner image upon a flexible belt by means of electrophotographic printing methods or techniques, and the transfer of such multicolor toner image directly to the material or object to be printed, such as, for example, a container made of, for example, metal, paper, plastic, glass, or the like, by means of a thermo-transferring process. In accordance with a second embodiment of the invention, the multicolor toner image is formed upon a plastic film, which is laminated upon the flexible belt, by means of electrophotographic printing methods or techniques, and the plastic film is then transferred to and fused upon the container. In accordance with a third embodiment of the invention, a photoconductive member is irradiated by means of exposure light upon a rear surface thereof wherein the multicolor picture images are also formed by electrophotographic printing methods or techniques. In this manner, previously formed toner images upon the photoconductive member do not interfere with the image exposure processing.

U.S. Pat. No. 5,126,797 granted on Jun. 30, 1992 to Forest et al. discloses a method and apparatus for laminating toner images wherein a toner image on a receiving sheet is laminated using a transparent laminating sheet fed from the normal copy sheet supply of a copier, printer or the like. The laminating sheet is fed into laminating contact with the toner image after the toner image has been formed on a receiving sheet. The resulting sandwich is fed through the fuser laminating the image between the sheets. The invention is particularly usable in forming color transparencies.

U.S. Pat. No. 5,108,865 granted to Zwaldo et al on Apr. 28, 1992 discloses a method including the steps of: contacting an image (preferably multi-toned image) with a transfer web(intermediate receptor layer) comprising in sequence, a carrier layer, a transferable release layer, and a releasable adhesive layer (releasable from the carrier layer along with the transferable release layer so that both layers transfer at once), said adhesive layer being in contact with said toned image, said contacting being done under sufficient heat and/or pressure to enable said toned image to be adhered to said releasable adhesive layer with greater strength than the adherence of said toned image to said imaging surface of said photoconductive layer; separating the transfer web and said photoconductive layer so that the toned image is removed from said photoconductive layer and remains adhered to the adhesive layer of the transfer web; contacting the surface of the transfer web having both the multi-toned image and adhesive thereon with a permanent receptor removing the carrier layer of the transfer web from the adhesive and the release layer of the transfer web so that an image article is formed of the permanent receptor, multi-toned image, releasable adhesive, and the resultant surface coating of the release layer which is furthest away from the permanent receptor.

U.S. Pat. Nos. 4,868,049 and 4,724,026 granted to Marshall A. Nelson on Feb. 9, 1988 and Sep. 19, 1989, respectively disclose selective metallic transfer foils for selectively transferring metallic foil to xerographic images on are receiving substrate such as paper. The transfer sheet comprises, in successive layers, a carrier film, a metallic film and an adhesive, the adhesive containing a dispersion of 0.5 micron or larger particulate material. A method is disclosed for forming images overlaid with metallic foil. According to the method of the invention, a sheet comprising xerographic images is provided and placed in face-to-face contact with a metal transfer sheet, to form a sandwich with the xerographic images on the inside. Heat and pressure are applied to the sandwich, causing the xerographic images to become tacky and causing the metallic foil to selectively adhere to the images. The remainder of the transfer sheet is then stripped away from the resulting decorated sheet comprising xerographic images overlaid with metallic foil.

U.S. Pat. No. 3,914,097 granted to Donald R. Wurl on Oct. 21, 1975 discloses a sheet guide and cooling apparatus for preventing curl in sheets bearing a developed image, the image being permanently fixed to the sheet by application of heat and pressure. The apparatus is positioned to have a flat thermally conductive surface establishing a path for the sheet, downstream of the fixing area, the path extending in a plane substantially coplanar with the plane of sheet travel in the fixing station. Vacuum means associated with the surface maintains successive incremental portions of a sheet in face-to-face contact with the flat surface as it is being guided for at least a predetermined period as the sheet moves along the path and furthermore, provides a flow of cooling air for the surface.

U.S. patent application Ser. No. 07/828,821 filed on Sep. 31, 1992 discloses a method and apparatus for enhancing color fidelity in a printing process employing an intermediate member wherein a developing unit deposits a colorless and transparent material directly onto an intermediate member before transfer of any color toner images thereto. Alternatively, a developing unit first deposits the colorless and transparent material on a latent image member. The colorless and transparent material is then transferred to the intermediate member before transfer of any color toner images thereto.

U.S. Pat. No. 5,663,023 relates to coated sheets or substrates such as paper, opaque Mylar, Teslin or the like which are utilized in the creation of simulated, photographic-quality prints formed using non photographic imaging procedures such as xerography and ink jet. A first substrate has a reverse reading image formed thereon. Such an image may be formed using conventional color xerography. A second substrate having a right reading image containing the same information as the first substrate is adhered to the first substrate. The foregoing results in a simulated photographic-quality print which has a relatively high optical density compared to prints using only the reverse reading image on the one substrate.

There is a continuing need for improved coated backing sheets which can be laminated by the application of heat and pressure to the toned images obtained from electrophotographic imaging processes as well as ink jet printing processes.

BRIEF SUMMARY OF THE INVENTION

The present invention is directed to creating and using coated backing sheets or substrates such as paper, opaque Mylar™, Teslin™ or the like. The sheets or substrates are utilized in creating simulated photographic-quality prints using imaging procedures such as xerography and ink jet.

A coating on one side of a backing sheet comprises a lightfastness material and a polymeric binder having a glass transition temperature of less than 55° C. The other side of the backing sheet is uncoated.

The backing sheet with a coating including the lightfastness material is adhered to a transparent sheet or substrate having a reverse reading toner image thereon. The lightfastness material protects the color toner images from degradation in the presence of UV light.

Other features of the present invention will become apparent as the following description proceeds and upon reference to the drawings, in which:

DETAILED DESCRIPTION OF THE PREFERRED EMBODIMENT OF THE INVENTION

Figure 1:
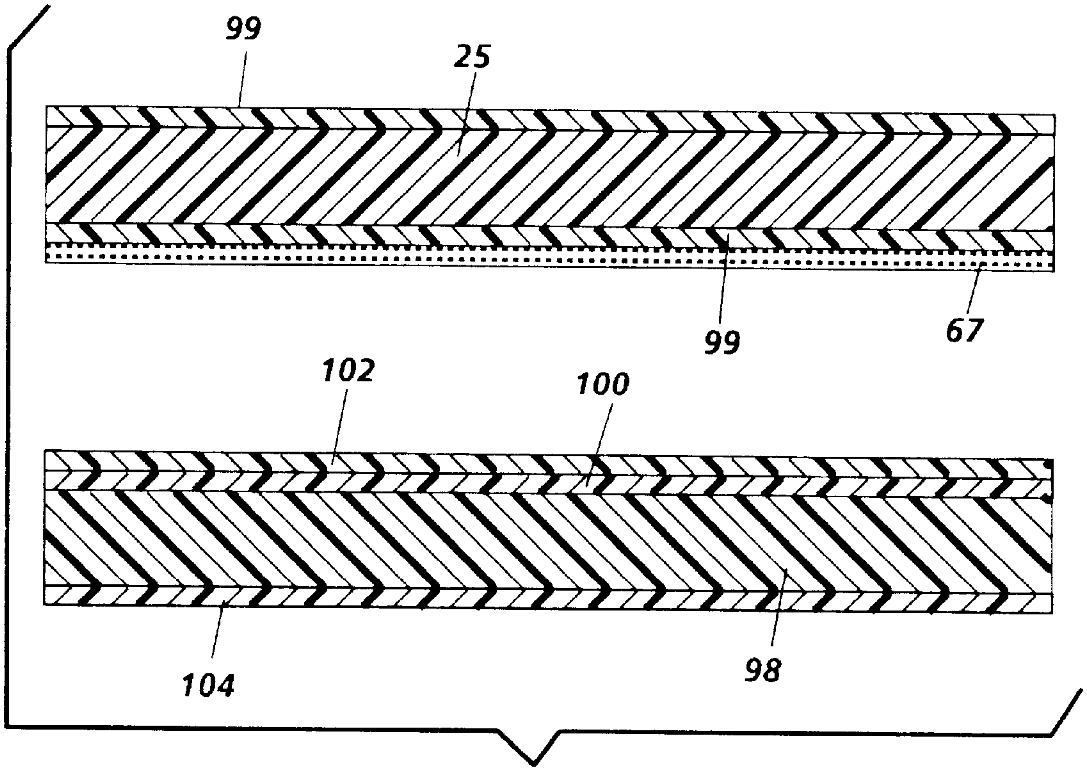
FIG. 1 is an elevational view of a pair of substrates, one a transparency containing a reverse reading image and the other a coated backing sheet used for creating a simulated color, photographic-quality prints.

For a general understanding of the features of the present invention, reference is made to the drawings. In the drawings, like reference numerals have been used throughout to identify identical elements.

While the present invention will hereinafter be described in connection with least one preferred embodiment, it will be understood that it is not intended to limit the invention to that embodiment. On the contrary, it is intended to cover all alternatives, modifications and equivalents as may be included within the spirit and scope of the invention as defined by the appended claims.

For a general understanding of the features of the present invention, reference is made to the drawings. In the drawings, like references have been used throughout to designate identical elements. It will become evident from the following discussion that the present invention is equally well suited for use in a wide variety of printing systems, and is not necessarily limited in its application to the particular system shown herein.

Figure 2:
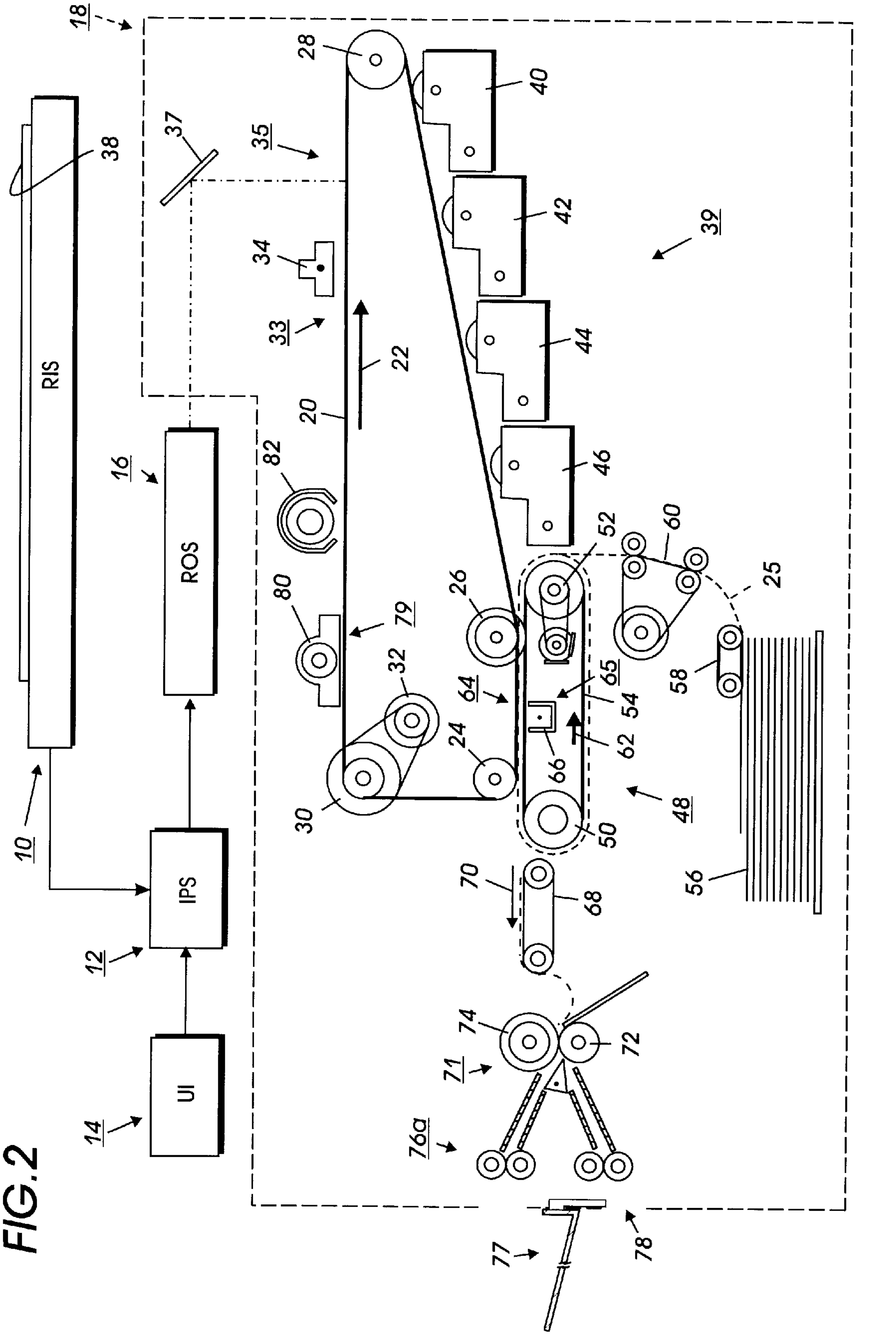
FIG. 2 is a schematic elevational view of an illustrative electrophotographic copier which may be utilized in carrying out the present invention.

Turning initially to FIG. 2, during operation of a printing system 9, a multi-color original document or photograph 38 is positioned on a raster input scanner (RIS), indicated generally by the reference numeral 10. The RIS contains document illumination lamps, optics, a mechanical scanning drive, and a charge coupled device (CCD array). The RIS captures the entire original document and converts it to a series of raster scan lines and measures a set of primary color densities, i.e. red, green and blue densities, at each point of the original document. This information is transmitted to an image processing system (IPS), indicated generally by the reference numeral 12. IPS 12 contains control electronics which prepare and manage the image data flow to a raster output scanner (ROS), indicated generally by the reference numeral 16. A user interface (UI), indicated generally by the reference numeral 14, is in communication with IPS 12. UI 14 enables an operator to control the various operator adjustable functions. The output signal from UI 14 is transmitted to IPS 12. Signals corresponding to the desired image are transmitted from IPS 12 to a ROS 16, which creates the output image. ROS 16 lays out the image in a series of horizontal scan lines with each line having a specified number of pixels per inch. ROS 16 includes a laser having a rotating polygon mirror block associated therewith. ROS 16 is utilized for exposing a uniformly charged photoconductive belt 20 of a marking engine, indicated generally by the reference numeral 18, to achieve a set of subtractive primary latent images. The latent images are developed with cyan, magenta, and yellow developer material, respectively. These developed images are transferred to a final substrate in superimposed registration with one another to form a multi-color image on the substrate. This multi-color image is then heat and pressure fused to the substrate thereby forming a multi-color toner image thereon. The printing system illustrated in FIG. 2 is capable of printing conventional right reading toner images on plain paper or mirror images on various other kinds of substrates utilized in the commercially available 5775 [redacted] copier. With continued reference to FIG. 2, printer or marking engine 18 is an electrophotographic printing machine. Photoconductive belt 20 of marking engine 18 is preferably made from a polychromatic photoconductive material. The photoconductive belt moves in the direction of arrow 22 to advance successive portions of the photoconductive surface sequentially through the various processing stations disposed about the path of movement thereof. Photoconductive belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform electrostatic potential.

Next, the charged photoconductive surface is moved through an exposure station, indicated generally by the reference numeral 35. Exposure station 35 receives a modulated light beam corresponding to information derived by RIS 10 having a multi-color original document 38 positioned thereat. RIS 10 captures the entire image from the original document 38 and converts it to a series of raster scan lines which are transmitted as electrical signals to IPS 12. The electrical signals from RIS 10 correspond to the red, green and blue densities at each point in the original document. IPS 12 converts the set of red, green and blue density signals, i.e. the set of signals corresponding to the primary color densities of original document 38, to a set of colorimetric coordinates. The operator actuates the appropriate keys of UI 14 to adjust the parameters of the copy. UI 14 may be a touch screen, or any other suitable control panel, providing an operator interface with the system. The output signals from UI 14 are transmitted to IPS 12. The IPS then transmits signals corresponding to the desired image to ROS 16, ROS 16 includes a laser with a rotating polygon mirror block. Preferably, a nine facet polygon is used. ROS 16 illuminates, via mirror 37, the charged portion of photoconductive belt 20 at a rate of about 400 pixels per inch. The ROS will expose the photoconductive belt to record three latent images. One latent image is developed with cyan developer material. Another latent image is developed with magenta developer material and the third latent image is developed with yellow developer material. The latent images formed by ROS 16 on the photoconductive belt correspond to the signals transmitted from IPS 12.

According to the present invention, the document 38 preferably comprises a black and white or color photographic print. It will be appreciated that various other documents may be employed without departing from the scope and true spirit of the invention.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to a compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is closely adjacent the photoconductive belt, while in the non-operative position, the magnetic brush is spaced therefrom. In FIG. 2, developer unit 40 is shown in the operative position with developer units 42, 44 and 46 being in the non-operative position. During development of each electrostatic latent image, only one developer unit is in the operative position, the remaining developer units are in the non-operative position. This ensures that each electrostatic latent image is developed with toner particles of the appropriate color without commingling.

It will be appreciated by those skilled in the art that scavengeless or non-interactive development systems well known in the art could be used in lieu of magnetic brush developer structures. The use of non-interactive developer systems for all but the first developer housing would make it unnecessary for movement of the developer housings relative to the photoconductive imaging surface.

After development, the toner image is moved to a transfer station, indicated generally by the reference numeral 65. Transfer station 65 includes a transfer zone, generally indicated by reference numeral 64. In transfer zone 64, the toner image is transferred to a transparent substrate 25. At transfer station 65, a substrate transport apparatus, indicated generally by the reference numeral 48, moves the substrate 25 into contact with photoconductive belt 20. Substrate transport 48 has a pair of spaced belts 54 entrained about a pair of substantially cylindrical rollers 50 and 52. A substrate gripper (not shown) extends between belts 54 and moves in unison therewith. The substrate 25 is advanced from a stack of substrates 56 disposed on a tray. A friction retard feeder 58 advances the uppermost substrate from stack 56 onto a pre-transfer transport 60. Transport 60 advances substrate 25 to substrate transport 48. Substrate 25 is advanced by transport 60 in synchronism with the movement of substrate gripper, not shown. In this way, the leading edge of substrate 25 arrives at a preselected position, i.e. a loading zone, to be received by the open substrate gripper. The substrate gripper then closes securing substrate 25 thereto for movement therewith in a recirculating path. The leading edge of substrate 25 is secured releasably by the substrate gripper. As belts 54 move in the direction of arrow 62, the substrate moves into contact with the photoconductive belt, in synchronism with the toner image developed thereon. At transfer zone 64, a corona generating device 66 sprays ions onto the backside of the substrate so as to charge the substrate to the proper electrostatic voltage magnitude and polarity for attracting the toner image from photoconductive belt 20 thereto. The substrate remains secured to the substrate gripper so as to move in a recirculating path for three cycles. In this way, three different color toner images are transferred to the substrate in superimposed registration with one another to form a composite multi-color image 67, FIG. 1.

Referring again to FIG. 2 one skilled in the art will appreciate that the substrate may move in a recirculating path for four cycles when under color removal and black generation is used and up to eight cycles when the information on two original documents is being merged onto a single substrate. Each of the electrostatic latent images recorded on the photoconductive surface is developed with the appropriately colored toner and transferred, in superimposed registration with one another, to the substrate to form a multi-color facsimile of the colored original document. As may be appreciated, the imaging process is not limited to the creation of color images. Thus, high optical density black and white simulated photographic-quality prints may also be created using the process disclosed herein.

After the last transfer operation, the substrate gripper opens and releases the substrate 25. A conveyor 68 transports the substrate, in the direction of arrow 70, to a heat and pressure fusing station, indicated generally by the reference numeral 71, where the transferred toner image is permanently fused to the substrate. The fusing station includes a heated fuser roll 74 and a pressure roll 72. The substrate passes through the nip defined by fuser roll 74 and pressure roll 72. The toner image contacts fuser roll 74 so as to be affixed to the transparent substrate. Thereafter, the substrate is advanced by a pair of rolls to an outlet opening 78 through which substrate 25 is conveyed. Alternatively, the substrates can be advanced by a pair of rollers **76*a* to a catch tray 77**.

The last processing station in the direction of movement of belt 20, as indicated by arrow 22, is a cleaning station, indicated generally by the reference numeral 79. A rotatably mounted fibrous brush 80 is positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

A process and apparatus for forming simulated photographic-quality prints which use the transparency 25 containing the composite, reverse reading color image 67 and a coated backing sheet 98 are disclosed in U.S. Pat. No. 5,337,132 granted to Abraham Cherian on Aug. 9, 1994. Alternatively, simulated photographic-quality prints may be created using the apparatus and method described in U.S. Pat. No. 5,327,201 granted to Coleman et al on Jul. 5, 1994.

Examples of substantially transparent substrate materials include polyesters, including Mylar™, available from E. I. Du Pont de Nemours & Company, Melinex™, available from Imperial Chemicals, Inc., Celanar™, available from Celanese Corporation, polyethylene naphthalates, such as Kaladex PEN films, available from Imperial Chemical Industries, polycarbonates such as Lexan™, available from General Electric Company, polysulfones, such as those available from Union Carbide Corporation, polyether sulfones, such as those prepared from 4,4'-diphenyl ether, such as Udel™, available from Union Carbide Corporation, those prepared from disulfonyl chloride, such as Victrex™, available from ICI Americas Incorporated, those prepared from biphenylene, such as Astrel™, available from 3M Company, poly (arylene sulfones), such as those prepared from crosslinked poly(arylene ether ketone sulfones), cellulose triacetate, polyvinylchloride cellophane, polyvinyl fluoride, polyimides, and the like, with polyester such as Mylar™ being preferred in view of its availability and relatively low cost. The substrate can also be opaque, including opaque plastics, such as Teslin™, available from PPG Industries, and filled polymers, such as Melinex®, available from ICI. Filled plastics can also be employed as the substrate, particularly when it is desired to make a "never-tear paper" recording sheet. Paper is also suitable, including plain papers such as Xerox® 4024, diazo papers, or the like.

The substrates can be of any effective thickness. Typical thicknesses for the substrate are from about 50 to about 500 microns, and preferably from about 100 to about 125 microns, although the thickness can be outside these ranges.

Each of the substrates 25 and 98 may be provided with one or more coatings for producing enhanced simulated color photographic-quality prints using non photographic imaging processes such as xerography. Each substrate is preferably coated on one side with at least one coating.

The transparent substrate 25 is provided with a coating 99 on each side or surface thereof which coating is comprised of, for example, a hydrophilic polymer such as a latex polymer.

In a first coating 100 carried by one surface of the backing sheet 98, a binder may be present in any effective amount; typically the binder or mixture thereof is present in amounts of from about 70 percent by weight to about 90 percent by weight although the amounts can be outside of this range. An Optional antistatic agent, biocide and/or filler may be included in the coating 100.

Pursuant to the invention, the first coating 100 also includes a lightfastness material for minimizing degradation of the color images 67 as the result of exposure to UV. A second coating 102 applied to the first coating 100 comprises a hydrophilic polymeric binder. A third coating 104 which is be applied to the opposite side or surface of the backing sheet from the coating 100 includes a mixture of a hydrophobic polymer which is waterfast and highly scuff resistant.

The first coating 100 composition is present on one side of the substrate used as the coated backing sheet in any effective thickness. Typically, the total thickness of the coating layer is from about 0.1 to about 25 microns and preferably from about 0.5 to 10 microns, although the thickness can be outside of these ranges. In the first coating composition, the binder can be present within the coating in any effective amount, typically the binder or mixture thereof are present in amounts of from about 70 percent by weight to about 90 percent by weight although the amounts can be outside of this range. The antistatic agent or mixture thereof are present in the first coating composition, # in amounts of from about 0.5 percent by weight to about 20 percent by weight although the amounts can be outside of this range. The lightfastness inducing compounds or mixture thereof are present in the first coating 100 of the backing sheet in amounts of from about 0.5 percent by weight to about 20 percent by weight although the amounts can be outside of this range.

The first coating 100 polymer in contact with the substrate comprises a water dispersible polymer such as (A) Latex polymers (polymers capable of forming a latex is, for the purposes of the present disclosure, a polymer that forms in water or in an organic solvent a stable colloidal system in which the disperse phase is polymeric). # Examples of suitable latex-forming polymers include rubber latex such as neoprene available from Serva Biochemicals, polyester latex such as Eastman AQ 29D available from Eastman Chemical Company, vinyl chloride latex, such as Geon 352 from B. F. Goodrich Chemical Group, ethylene-vinyl chloride copolymer emulsions, such as Airflex ethylene-vinyl chloride from Air Products and Chemicals, poly vinyl acetate homopolymer emulsions, such as Vinac from Air Products and Chemicals, carboxylated vinyl acetate emulsion resins, such as Synthemul synthetic resin emulsions 40-502, 40-503, and 97-664 from Reichhold Chemicals Inc. and Polyco 2149, 2150, and 2171, from Rohm and Haas Co., vinyl acetate copolymer latex, such as 76 RES 7800 from Union Oil Chemicals Divisions and Resyn 25-1103, Resyn 25-1109, Resyn 25-1119, and Resyn 25-1189 from National Starch and Chemical Corporation, ethylene-vinyl acetate copolymer emulsions, such as Airflex ethylene-vinylacetate from Air Products and Chemicals Inc., acrylic-vinyl acetate copolymer emulsions, such as Rhoplex AR-74 from Rohm and Haas Co, Synthemul 97-726 from Reichhold Chemicals Inc., Resyn 25-1140, 25-1141, 25-1142, and Resyn-6820 from National Starch and Chemical Corporation, vinyl acrylic terpolymer latex, such as 76 RES 3103 from Union Oil Chemical Division and Resyn 25-1110 from National Starch and Chemical Corporation, acrylic emulsion latex, such as Rhoplex B-15J, Rhoplex P-376, Rhoplex TR-407, Rhoplex E-940, Rhoplex TR-934, Rhoplex TR-520, Rhoplex HA-24, and Rhoplex NW-1825 from Rohm and Haas Company and Hycar 2600×322, Hycar 2671, Hycar 2679, Hycar 26120, and Hycar 2600×347 from B. F. Goodrich Chemical Group, polystyrene latex, such as DL6622A, DL6688A, and DL6687A from Dow Chemical Company, styrene-butadiene latexes, such as 76 RES 4100 and 76 RES 8100 available from Union Oil Chemicals Division, Tylac resin emulsion 68-412, Tylac resin emulsion 68-067, 68-319, 68-413, 68-500, 68-501, available from Reichhold Chemical Inc., and DL6672A, DL6663A, DL6638A, DL6626A, DL6620A, DL615A, DL617A, DL620A, DL640A, DL650A From Dow Chemical Company, butadiene-acrylonitrile latex, such as Hycar 1561 and Hycar 1562 from B. F. Goodrich Chemical Group and Tylac Synthetic Rubber Latex 68-302 from Reichhold Chemicals Inc., butadiene-acrylonitrile-styrene terpolymer latex, such as Tylac synthetic rubber latex 68-513 from Reichhold Chemicals Inc., and the like, as well as mixtures thereof (B) water soluble polymers such as formaldehyde resins, such as melamine-formaldehyde resin (such as BC 309, available from British Industrial Plastics Limited), urea-formaldehyde resin (such as BC777, available from British Industrial Plastics Limited), and alkylated urea-formaldehyde resins, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as methylated urea-formaldehyde resins, available from American Cyanamid Company as Beetle 65); maleic anhydride and maleic acid containing polymers, such as vinyl alkyl ether-maleic anhydride copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinyl methyl ether-maleic anhydride copolymer #173, available from Scientific Polymer Products), alkylene-maleic anhydride copolymers, wherein alkylene has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as ethylene-maleic anhydride copolymer #2308, available from Poly Sciences Inc., also available as EMA from Monsanto Chemical Company), butadiene-maleic acid copolymers (such as #07787, available from Poly Sciences Inc.), octadecene-1-maleic anhydride copolymer such as #573 available from Scientific Polymer Products, vinylalkylether homopolymer such as polyvinylmethylether #025 available from Scientific Polymer Products, and vinylalkylether-maleic acid copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinylmethylether-maleic acid copolymer, available from GAF Corporation as Gantrez S-95), and alkyl vinyl ether-maleic acid esters, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as methyl vinyl ether-maleic acid ester #773, available from Scientific Polymer Products); (C) solvent soluble polymers such as poly (hydroxyalkyl methacrylates), wherein alkyl has from 1 to about 18 carbon atoms, including methyl, ethyl, propyl, butyl, hexadecyl, and the like, including poly(2-hydroxyethylmethacrylate), such as #414, #815, available from Scientific Polymer Products, and poly (hydroxypropylmethacrylate), such as #232 available from Scientific Polymer Products, poly (hydroxyalkylacrylates), wherein alkyl is methyl, ethyl, or propyl, including poly(2-hydroxyethyl acrylate), such as #850, available from Scientific Polymer Products, and poly(hydroxypropyl acrylate), such as #851, available from Scientific Polymer Products, , alkyl cellulose or aryl cellulose, wherein alkyl is methyl, ethyl, propyl, or butyl and aryl is phenyl or the like, including ethyl cellulose such as Ethocel N-22, available from Hercules Chemical Company, poly (vinylacetate), such as #346, #347, available from Scientific Polymer Products, and the like; ketone soluble polymers, such as those polymers soluble in acetone, including hydroxyalkyl cellulose acrylates and hydroxyaryl cellulose acrylates, wherein alkyl is methyl, ethyl, propyl, or butyl and aryl is phenyl or the like, including hydroxyethyl cellulose acrylate, such as #8630, available from Monomer-Polymer and Dajac Laboratories Inc., hydroxyalkyl cellulose methacrylates and hydroxyaryl cellulose methacrylates, wherein alkyl is methyl, ethyl, propyl, or butyl and aryl is phenyl or the like, including hydroxyethyl cellulose methacrylate, such as #8631, available from Monomer-Polymer and Dajac Laboratories Inc., polyalkylacrylates wherein alkyl has from 1 to about 18 carbon atoms, including methyl, ethyl, propyl, butyl, hexadecyl, and the like, including poly(methyl acrylate), such as #165, available from Scientific Polymer Products, poly(ethyl acrylate), such as #231, available from Scientific Polymer Products, poly(n-propyl acrylate), such as #877, available from Scientific Polymer Products, poly (isopropyl acrylate), such as #475, available from Scientific Polymer Products, poly(n-butyl acrylate), such as #234, available from Scientific Polymer Products , poly(tert-butyl acrylate), such as #223, available from Scientific Polymer Products, poly(2-methoxy ethyl acrylate), such as #891, available from Scientific Polymer Products, poly(benzyl acrylate), such as #883, available from Scientific Polymer Products, poly(n-hexyl acrylate), such as #640, available from Scientific Polymer Products, poly(2-ethylhexyl acrylate), such as #249, available from Scientific Polymer Products, poly(octyl acrylate), such as #298, available from Scientific Polymer Products, poly(isooctyl acrylate), such as #881, available from Scientific Polymer Products, poly (decyl acrylate), such as #216, available from Scientific Polymer Products, poly(isodecyl acrylate), such as #875, available from Scientific Polymer Products, poly(lauryl acrylate), such as #252, available from Scientific Polymer Products, poly(cyclohexyl acrylate), such as #690, available from Scientific Polymer Products, poly(octadecyl acrylate), such as #298, available from Scientific Polymer Products; polyalkylmethacrylates wherein alkyl has from 3 to about 18 carbon atoms, including propyl, butyl, hexadecyl, and the like, including poly(n-propyl methacrylate), such as #828, available from Scientific Polymer Products, poly(n-butyl methacrylate), such as #213, available from Scientific Polymer Products, poly(n-butyl methacrylate-co-isobutylmethacrylate), such as #209, available from Scientific Polymer Products, poly(tert-butylaminoethyl methacrylate), such as #882, available from Scientific Polymer Products, poly(n-hexyl methacrylate), such as #217, available from Scientific Polymer Products, poly(2-ethylhexyl methacrylate), such as #229, available from Scientific Polymer Products, poly(n-decylmeth acrylate), such as #884, available from Scientific Polymer Products, poly(isodecyl methacrylate), such as #220, available from Scientific Polymer Products, poly(lauryl methacrylate), such as #168, available from Scientific Polymer Products, poly (octadecyl methacrylate), such as #167, available from Scientific Polymer Products; polyalkylenes and their copolymers wherein alkyl has from 2 to about 6 carbon atoms, including, ethyl, propyl, butyl, including polyethylene such as #041, #042 , #535, #536, #558, #560, available from Scientific Polymer Products, polypropylene such as #130, #780, #781, #782, #783, available from Scientific Polymer Products, poly(1-butene) such as #128, #337, #338, available from Scientific Polymer Products, poly(isobutylene) such as #040A, #040B, #040E, #668, #681, #683, #684, available from Scientific Polymer Products, ethylene-propylene copolymer such as #454, #455, available from Scientific Polymer Products, ethylene-ethylacrylate copolymer such as #358, available from Scientific Polymer Products, isobutylene-co-isoprene copolymer such as #874, available from Scientific Polymer Products, ethylene-propylenediene terpolymer such as #350, #360, #448, #449, available from Scientific Polymer Products; polydienes including polyisoprene such as #036, #073, available from Scientific Polymer Products, polychloroprene such as #196, #502, #503, #504, available from Scientific Polymer Products, polybutadiene such as #206, #552, #894, available from Scientific Polymer Products, polybutadiene phenyl terminated such as #432, #433, #434, #435, #436, #437, #438, #443, available from Scientific Polymer Products, polybutadiene dicarboxy terminated such as #294, #524, #525, #526, available from Scientific Polymer Products; vinylalkylether polymers including polyvinylmethylether such as #450, available from Scientific Polymer Products, polyvinylisobutylether such as #425, available from Scientific Polymer Products;polyvinyl esters including poly(vinyl stearate) # such as #103, available from Scientific Polymer Products, poly(vinyl propionate) # such as #303, available from Scientific Polymer Products, poly(vinyl pivalate) # such as #306, available from Scientific Polymer Products, poly(vinyl neodecanoare) # such as #267, available from Scientific Polymer Products, poly vinyl acetate such as #346, #347, available from Scientific Polymer Products, low melt polyesters including poly(ethylene adipate) such as #147, available from Scientific Polymer Products, poly (ethylene succinate) such as #149, available from Scientific Polymer Products, poly(ethylene azelate) such as #842, available from Scientific Polymer Products, poly(1,4-butylene adipate) such as #150, available from Scientific Polymer Products, poly(trimethylene adipate) such as #594, available from Scientific Polymer Products, poly (trimethylene glutarate) such as #591, available from Scientific Polymer Products, poly(trimethylene succinate) such as #592, available from Scientific Polymer Products poly (hexamethylene succinate) such as #124 # available from Scientific Polymer Products, poly(diallyl phthalate) such as #010 # available from Scientific Polymer Products, poly (diallyl isophthalate) such as #011 # available from Scientific Polymer Products, as well as blends or mixtures of any of the above. Any mixtures of the above ingredients in any relative amounts can be employed. Water dispersible polymers are preferred over other types such as solvent based polymers because they are environment friendly.

Lightfastness inducing agents include UV absorbing compounds including 2-(4-benzoyl-3-hydroxyphenoxy) ethylacrylate (Cyasorb UV-416, #41,321-6, # available from Aldrich chemical company), 1,2-hydroxy-4-(octyloxy) benzophenone (Cyasorb UV-531, #41,315-1, # available from Aldrich chemical company), # poly[2-(4-benzoyl-3-hydroxyphenoxy)ethylacrylate](Cyasorb UV-2126, #41,323-2, # available from Aldrich chemical company), # hexadecyl 3,5-di-tert-butyl-4-hydroxy-benzoate(Cyasor UV-2908, #41,320-8, available from Aldrich chemical company), # poly[N,N-bis(2,2,6,6-tetramethyl-4-piperidinyl)-1,6-hexanediamine-co-2,4-dichloro-6-morpholino-1,3,5-triazine) (Cyasorb UV-3346, #41,324-0, available from Aldrich chemical company), 2-dodecyl-N-(2,2,6,6-tetramethyl-4-piperidinyl) succinimide(Cyasorb UV-3581, #41,317-8, # available from Aldrich chemical company), #2-dodecyl-N-(1,2,2,6,6-pentamethyl-4-piperidinyl) succinimide (Cyasorb UV-3604, #41,318-6, # available from Aldrich chemical company), # N-(1-acetyl-2,2,6,6-tetramethyl-4-piperidinyl)-2-dodecylsuccinimide (Cyasorb UV-3668, #41,319-4, # available from Aldrich chemical company), 1-[N-[poly(3-allyloxy-2-hydroxypropyl)-2-aminoethyl]-2-imidazolidinone (#41,026-8, available from Aldrich chemical company), # poly (2-ethyl-2-oxazoline)(#37,284-6, #37,285-4, #37,397-4, available from Aldrich chemical company). # The lightfastness inducing agents of the present invention include antioxidant and antiozonant compounds such as 2,2'-methylenebis(6-tertbutyl-4-methylphenol)(Cyanox 2246, #41,315-5, available from Aldrich chemical company), 2,2'-methylenebis(6-tert-butyl-4-ethylphenol)(Cyanox 425, #41,314-3, available from Aldrich chemical company), Tris(4-tert-butyl-3-hydroxy-2,6-dimethylbenzyl)isocyanurate (Cyanox 1790, #41,322-4, LTDP, #D12,840-6, available from Aldrich chemical company), # didodecyl 3,3'-thiodipropionate (Cyanox, LTDP, #D12,840-6, available from Aldrich chemical company), # ditridecyl 3,3'-thiodipropionate (Cyanox 711, #41,311-9, available from Aldrich chemical company), # ditetradecyl 3,3'-thiodipropionate (Cyanox, MTDP, #41,312-7, available from Aldrich chemical company), # ditoctadecyl 3,3'-thiodipropionate (Cyanox, STDP, #41,310-0, available from Aldrich chemical company), #1,3,5-trimethyl-2,4,6-tris (3,5-di-tert-butyl-4-hydroxybenzyl)benzene (Ethanox 300, #41,328-3, available from Aldrich chemical company), #2,6-ditert-butyl-4-(dimethylaminomethyl)phenol (Ethanox 703, #41,327-5, available from Aldrich chemical company).

In addition, the first coating may contain antistatic agents. Antistatic components can be present in any effective amount, and if present, typically are present in amounts of from about 0.5 to about 20.0 percent by weight of the coating composition.

Suitable antistatic agents include both anionic and cationic materials.

Monoester sulfosuccinates, diester sulfosuccinates and sulfosuccinamates are anionic antistatic components which have been found suitable for use in the first coating.

Suitable cationic antistatic components comprise diamino alkanes; quaternary salts; quaternary acrylic copolymer latexes; ammonium quaternary salts as disclosed in U.S. Pat. No. 5,320,902 (Malhotra et al); phosphonium quaternary salts as disclosed in U.S. Pat. No. 5,760,809; and sulfonium, thiazolium and benzothiazolium quaternary salts as disclosed in U.S. Pat. No. 5,314,747 (Malhotra and Bryant)

In addition, the first coatings of the coated backing sheets may contain pigment components which exhibit a light color. Pigments can be present in any effective amount, and if present, typically are present in amounts of from about 1 to about 75 percent by weight of the coating composition. Examples of pigment components include zirconium oxide (SF-EXTRA available from Z-Tech Corporation), colloidal silicas, such as Syloid 74, available from Grace Company (preferably present, in one embodiment, in an amount of from about 10 to about 70 percent by weight percent), titanium dioxide (available as Rutile or Anatase from NL Chem Canada, Inc.), hydrated alumina (Hydrad TMC-HBF, Hydrad TM-HBC, available from J. M. Huber Corporation), barium sulfate (K. C. Blanc Fix HD80, available from Kali Chemie Corporation), calcium carbonate (Microwhite Sylacauga Calcium Products), high brightness clays (such as Engelhard Paper Clays), calcium silicate (available from J. M. Huber Corporation), cellulosic materials insoluble in water or any organic solvents (such as those available from Scientific Polymer Products), blend of calcium fluoride and silica, such as Opalex-C available from Kemira. O. Y, zinc oxide, such as Zoco Fax 183, available from Zo Chem, blends of zinc sulfide with barium sulfate, such as Lithopane, available from Schteben Company, and the like, as well as mixtures thereof. Brightener pigments can enhance color mixing and assist in improving print-through in recording sheets of the present invention.

The second layer or coating 102 in contact with the first layer coating 100 is present on the substrate of the backing sheet of the present invention in any effective thickness. Typically, the total thickness of the second coating layer is from about 0.1 to about 25 microns and preferably from about 0.5 to 10 microns, although the thickness can be outside of these ranges.

The oxyalkylene-containing polymers of the second coating 102 in contact with the first coating 100 includes a poly (oxy methylene), such as #009, available from Scientific Polymer Products, poly (oxyethylene) or poly (ethylene oxide), such as POLY OX WSRN-3000, available from Union Carbide Corporation, ethylene oxide/propylene oxide copolymers, such as ethylene oxide/propylene oxide/ethylene oxide triblock copolymer, such as Alkatronic EGE-31-1, available from Alkaril Chemicals, propylene oxide/ethylene oxide/propylene oxide triblock copolymers, such as Alkatronic PGP 3B-1, available from Alkaril Chemicals, tetrafunctional block copolymers derived from the sequential addition of ethylene oxide and propylene oxide to ethylene diamine, the content of ethylene oxide in these block copolymers being from about 5 to about 95 percent by weight, such as Tetronic 50R8, available from BASF Corporation, ethylene oxide/2-hydroxyethyl methacrylate/ethylene oxide and ethylene oxide/hydroxypropyl methacrylate/ethylene oxide triblock copolymers, which can be synthesized via free radical polymerization of hydroxyethyl methacrylate or hydroxypropyl methacrylate with 2-aminoethanethiol using $\alpha,\alpha'$ azobisisobutyronitrile as initiator and reacting the resulting amino-semitelechelic oligo-hydroxyethyl methacrylate or amino-hydroxypropyl methacrylate with an isocyanate-polyethylene oxide complex in chlorobenzene at 0° C., and precipitating the reaction mixture in diethylether, filtering and drying in vacuum, ethylene oxide/4-vinyl pyridine/ethylene oxide triblock copolymers, which can be synthesized via anionic polymerization of 4-vinyl pyridine with sodium naphthalene as initiator at −78° C. and then adding ethylene oxide monomer, the reaction being carried out in an explosion proof stainless steel reactor, ionene/ethylene oxide/ionene triblock copolymers, which can be synthesized via quaternization reaction of one end of each 3–3 ionene with the halogenated (preferably brominated) poly(oxyethylene) in methanol at about 40° C., ethylene oxide/isoprene/ethylene oxide triblock copolymers, which can be synthesized via anionic polymerization of isoprene with sodium naphthalene in tetrahydrofuran as solvent at −78° C. and then adding monomer ethylene oxide and polymerizing the reaction for three days, after which time the reaction is quenched with methanol, the ethylene oxide content in the aforementioned triblock copolymers being from about 20 to about 70 percent by weight and preferably about 50 percent by weight, and the like, # epichlorohydrin-ethyleneoxide copolymer such as #155 available from Scientific Polymer Products, # as well as mixtures thereof. The preferred oxyalkylene containing polymers are poly (ethylene oxide), poly (propylene oxide), and ethylene oxide/propylene oxide block copolymers because of their availability and lower cost.

The coating compositions discussed above can be applied to the substrate by any suitable technique. For example, the coatings can be applied by a number of known techniques, including melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material (which generally is dissolved in a solvent) is transferred from a steel applicator roll onto the web material to be coated. The metering roll is stationary or is rotating slowly in the direction opposite to that of the applicator roll. In slot extrusion coating, a flat die is used to apply coating material (which generally is dissolved in a solvent) with the die lips in close proximity to the web of material to be coated. The die can have one or more slots if multilayers are to be applied simultaneously. In the multilayer slot coating, the coating solutions form a liquid stack in the gap where the liquids come in the contact with the moving web to form a coating. The stability of the interface between the two layers depends on wet thickness, density and viscosity ratios of both layers which need to be kept as close to one as possible. Once the desired amount of coating has been applied to the web, the coating is dried, typically at from about 25 to about 100° C. in an air drier.

Laminated recording sheets of the present invention exhibit reduced curl upon being printed with aqueous inks. Generally, the term "curl" refers to the distance between the base line of the arc formed by recording sheet when viewed in cross-section across its width (or shorter dimension—for example, 8.5 inches in an 8.5×11 inch sheet, as opposed to length, or longer dimension—for example, 11 inches in an 8.5×11 inch sheet) and the midpoint of the arc. To measure curl, a sheet can be held with the thumb and forefinger in the middle of one of the long edges of the sheet (for example, in the middle of one of the 11 inch edges in an 8.5×11 inch sheet) and the arc formed by the sheet can be matched against a pre-drawn standard template curve.

The gloss values recited herein were obtained on a 75° Glossmeter, Glossgard II from Pacific Scientific (Gardner/Neotec Instrument Division).

The optical density measurements recited herein were obtained on a Pacific Spectrograph Color System. The system consists of two major components, an optical sensor and a data terminal. The optical sensor employs a 6 inch integrating sphere to provide diffuse illumination and 2 degrees viewing. This sensor can be used to measure both transmission and reflectance samples. When reflectance samples are measured, a specular component may be included. A high resolution, full dispersion, grating monochromator was used to scan the spectrum from 380 to 720 nanometers (nm). The data terminal features a 12 inch CRT display, numerical keyboard for selection of operating parameters, and the entry of tristimulus values, and an alphanumeric keyboard for entry of product standard information. The print through value as characterized by the printing industry is Log base 10 (reflectance of a single sheet of unprinted paper against a black background/reflectance of the back side of a black printed area against a black background) measured at a wavelength of 560 nanometers.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Preparation of two layered adhesive/toner wetting coating 100/102 for adhering backing sheets to imaged transparent substrates using two coating steps:

Preparation of adhesive coating 100 on the backing sheets:

Twenty coated backing sheets were prepared by the solvent extrusion process (single side each time initially) on a Faustel Coater using a one slot die, by providing for each a photographic paper base sheet (roll form) with a thickness of 112 microns such as C-654 Scholler Graphic Papers available from Scholler Technical Papers Incorporated, and coating the base sheet with a polyester adhesive composition comprised of 90 percent by weight polyester latex Eastman AQ 29D available from Eastman Chemical Company, ), 5.0 percent by weight of the antistatic agent Alkasurf SS-L7DE available from Alkaril Chemicals, 3.0 percent by weight of poly[N,N-bis(2,2,6,6-tetramethyl-4-piperidinyl)-1,6-hexanediamine-co-2,4-dichloro-6-morpholino-1,3,5-triazine) (Cyasorb UV-3346, #41,324-0, available from Aldrich chemical company) and 2.0 percent by weight of didodecyl 3,3'-thiodipropionate, which composition was present in a concentration of 35 percent by weight in water. Subsequent to air drying at 100° C. and monitoring the difference in weight prior to and subsequent to coating, the dried photographic paper base sheet rolls contained 1 gram, 10 microns in thickness, of the polyester adhesive coating 100.

Preparation of toner wetting hydrophilic coating 102 on adhesive coating 100 of the backing sheets:

This dried polyester layer was further overcoated with a hydrophilic polymer having excellent image-wetting properties such as poly(ethylene oxide) (POLYOX WSRN-3000, # obtained from Union Carbide Company) present in a concentration of 5 percent by weight in water. Subsequent to air drying at 100° C. and monitoring the difference in weight prior to and subsequent to coating, the dried photographic paper base sheet rolls contained 1 gram, 10 microns in thickness, # of poly(ethylene oxide). The coated backing sheets were cut from this roll in 8.5×11.0" cut sheets.

Preparation of the xerographic image on transparencies containing coating 99:

Transparency sheets were prepared by a dip coating process (both sides coated in one operation) by providing Mylar® sheets (8.5×11 inches) in a thickness of 100 microns and coating them with blends of a binder resin, polyester latex (Eastman AQ 29D), 80 percent by weight, (±)-β,β-dimethyl-γ-(hydroxymethyl)-γ-butyrolactone (Aldrich 26,496-2), 18 percent by weight; D,L-carnitinamide hydrochloride (Aldrich 24,783-9), 1 percent by weight and a traction agent colloidal silica, Syloid 74, obtained from W. R. Grace & Co., 1 percent by weight, which blend was present in water solution in a concentration of 25 percent by weight, as described in the U.S. Pat. No. 5,451,458 with the named inventor Shadi L. Malhotra, entitled "Recording Sheets" the disclosure of which is totally incorporated herein by reference. The coated MYLAR sheets were then dried in a vacuum hood for one hour. Measuring the difference in weight prior to and subsequent to coating these sheets indicated an average coating weight of about 300 milligrams on each side in a thickness of about 3 microns 20 sheets of these transparencies were fed into a Xerox 5775 color copier and images were obtained having optical density values of 1.25 (cyan), 1.10 (magenta), 0.75 (yellow) and 1.40 (black).

Lamination of imaged transparencies containing coating 99 with the coated backing sheets containing coating 100/104:

The imaged side of the transparency was brought in contact with the poly(ethylene oxide) coated side of the coated backing sheet and laminated together at 100° C. and a pressure of 100 psi for 2 minutes in a Model 7000 Laminator from Southwest Binding Systems, Ontario, Canada. The laminated structure of paper and plastic had a gloss of 130 units, and optical density values of 1.37 (cyan), 1.23 (magenta), 0.87 (yellow) and 1.54 (black). These images were waterfast when washed with water for 2 minutes at 50° C. and lightfast for a period of three months without any change in their optical density.

EXAMPLE II

Preparation of two layered adhesive/toner wetting coating 100/102 for adhering backing sheets to imaged transparent substrates using one coating step:

Twenty opaque coated backing sheets were prepared by the solvent extrusion process (single side each time initially) on a Faustel Coater using a two slot die, by providing for each a Teslin™ sheet (roll form), available from PPG Industries, with a thickness of 150 microns and coating the base sheet simultaneously with two hydrophilic polymeric layers where the first layer in contact with the substrate was a blend of 90 percent by weight acrylic emulsion latex, Rhoplex B-15J, from Rohm and Haas Company, 5.0 percent by weight of the antistatic agent Alkasurf SS-0-75, available from Alkaril Chemicals, 3.0 percent by weight of the UV absorbing compound poly[N,N-bis(2,2,6,6-tetramethyl-4-piperidinyl)-1,6-hexanediamine-co-2,4-dichloro-6-morpholino-1,3,5-triazine) (Cyasorb UV-3346, 441,324-0, available from Aldrich chemical company) and 2 percent by weight of an antioxidant compound 2,6-ditert-butyl-4-(dimethylaminomethyl)phenol (Ethanox 703, #41,327-5, available from Aldrich chemical company), which composition was present in a concentration of 35 percent by weight in water and the second layer in contact with the first layer was a polymer having excellent image-wetting properties such as poly(ethylene oxide) (POLYOX WSRN-3000, obtained from Union Carbide Company) present in a concentration of 2 percent by weight in water. Subsequent to air drying the two layers simultaneously at 100° C. and monitoring the difference in weight prior to and subsequent to coating, the dried Teslin sheets contained 1.5 gram, 15 microns in thickness, of Rhoplex B-15J overcoated with poly(ethylene oxide). The coated backing sheets were cut from this roll in 8.5×11.0" cut sheets.

Preparation of the ink jet ink images on transparencies containing coating 99:

Transparency sheets containing hydrophilic ink receiving layers were prepared as follows as described in U.S. Pat. No. 5,714,697 with the named inventor Shadi L. Malhotra, entitled "Recording Sheets containing Oxazole, Isooxazole, Oxazolidinone, Oxazoline Salt, Morpholine, Thiazole, Thiazolidine, Thiadiazole, and Phenothiazine Compounds" the disclosure of which is totally incorporated herein by reference. Blends of 54 percent by weight hydroxypropyl methyl cellulose (K35LV, obtained from Dow Chemical Co.), 36 percent by weight poly(ethylene oxide) (POLY OX WSRN-3000, obtained from Union Carbide Corp., and 10 percent by weight of additive 4-morpholine propane sulfonic acid obtained from Aldrich Chemical Co., were prepared by mixing 43.2 grams of hydroxypropyl methyl cellulose, 28.8 grams of poly(ethylene oxide), and 8 grams of the 4-morpholine propane sulfonic acid in 1,000 milliliters of water in a 2 Liter jar and stirring the contents in an Omni homogenizer for 2 hours. Subsequently, the solution was left overnight for removal of air bubbles. The blends thus prepared were then coated by a dip coating process (both sides coated in one operation) by providing MYLAR base sheets in cut sheet form (8.5×11 inches) in a thickness of 100 microns. Subsequent to air drying at 25° C. for 3 hours followed by oven drying at 100° C. for 10 minutes and monitoring the difference in weight prior to and subsequent to coating, the dried coated sheets contained 1 gram, 10 microns in thickness of the ink receiving layers, on each surface (2 grams total coating weight for 2-sided transparency) of the substrate.

The transparency sheets thus prepared were incorporated into a Hewlett-Packard 500-C color ink jet printer containing inks of the following compositions:

Cyan: 15.785 percent by weight sulfolane, 10.0 percent by weight butyl carbitol, 2.0 percent by weight ammonium bromide, 2.0 percent by weight N-cyclohexylpyrollidinone obtained from Aldrich Chemical company, 0.5 percent by weight Tris (hydroxymethyl)aminomethane obtained from Aldrich Chemical company, 0.35 percent by weight EDTA (ethylenediamine tetra acetic acid) obtained from Aldrich Chemical company, 0.05 percent by weight Dowicil 150 biocide, obtained from Dow Chemical Co., Midland, Mich, 0.03 percent by weight polyethylene oxide (molecular weight 18,500), obtained from Union Carbide Co.), 35 percent by weight Projet Cyan 1 dye, obtained from ICI, 34.285 percent by weight deionized water.

Magenta: 15.785 percent by weight sulfolane, 10.0 percent by weight butyl carbitol, 2.0 percent by weight ammonium bromide, 2.0 percent by weight N-cyclohexylpyrollidinone obtained from Aldrich Chemical company, 0.5 percent by weight Tris (hydroxymethyl) aminomethane obtained from Aldrich Chemical company, 0.35 percent by weight EDTA (ethylenediamine tetra acetic acid) obtained from Aldrich Chemical company, 0.05 percent by weight Dowicil 150 biocide, obtained from Dow Chemical Co., Midland, Mich., 0.03 percent by weight polyethylene oxide (molecular weight 18,500), obtained from Union Carbide Co.), 25 percent by weight Projet magenta 1T dye, obtained from ICI, 4.3 percent by weight Acid Red 52 obtained from Tricon Colors, 39.985 percent by weight deionized water.

Yellow: 15.785 percent by weight sulfolane, 10.0 percent by weight butyl carbitol, 2.0 percent by weight ammonium bromide, 2.0 percent by weight N-cyclohexylpyrollidinone obtained from Aldrich Chemical company, 0.5 percent by weight Tris (hydroxymethyl)aminomethane obtained from Aldrich Chemical company, 0.35 percent by weight EDTA (ethylenediamine tetra acetic acid) obtained from Aldrich Chemical company, 0.05 percent by weight Dowicil 150 biocide, obtained from Dow Chemical Co., Midland, Mich., 0.03 percent by weight polyethylene oxide (molecular weight 18,500), obtained from Union Carbide Co.), 27.0 percent by weight Projet yellow 1G dye, obtained from ICI, 20.0 percent by weight Acid yellow 17 obtained from Tricon Colors, 22.285 percent by weight deionized water.

Images were generated having optical density values of 1.40 (cyan), 1.17 (magenta), 0.80 (yellow) and 1.75 (black)

Lamination of imaged transparencies containing coating 99 with the backing sheets containing coating 100/102:

The imaged side of the transparency was brought in contact with the poly(ethylene oxide) coated side of the coated backing sheet and laminated together at 150° C. and a pressure of 100 psi for 2 minutes in a Model 7000 Laminator from Southwest Binding Systems, Ontario, Canada. The laminated structure of paper and plastic had a gloss of 125 units, and optical density values of 1.47 (cyan), 1.25 (magenta), 0.90 (yellow) and 1.90 (black). These images were waterfast when washed with water for 2 minutes at 50° C. and lightfast for a period of three months without any change in their optical density

EXAMPLE III

Preparation of two layered adhesive/toner wetting coating 100/102 for adhering backing sheets to imaged transparent substrates using one coating step.

Twenty opaque coated backing sheets were prepared by the solvent extrusion process (single side each time initially)

on a Faustel Coater using a two slot die, by providing for each a Teslin™ sheet (roll form), available from PPG Industries, with a thickness of 150 microns and coating the base sheet simultaneously with two hydrophilic polymeric layers where the first layer in contact with the substrate was a blend of 90 percent by weight acrylic emulsion latex, Rhoplex B-15J, from Rohm and Haas Company, 5.0 percent by weight of the antistatic agent Alkasurf SS-0-75, available from Alkaril Chemicals, 3.0 percent by weight of the UV absorbing compound poly[N,N-bis(2,2,6,6-tetramethyl-4-piperidinyl)-1,6-hexanediamine-co-2,4-dichloro-6-morpholino-1,3,5-triazine (Cyasorb UV-3346, #41,324-0, # available from Aldrich chemical company) and 2 percent by weight of an antioxidant compound 2,6-ditert-butyl-4-(dimethylaminomethyl)phenol (Ethanox 703, #41,327-5, available from Aldrich chemical company), which composition was present in a concentration of 35 percent by weight in water and the second layer in contact with the first layer was a polymer having excellent image-wetting properties such as poly(ethylene oxide) (POLYOX WSRN-3000, # obtained from Union Carbide Company) present in a concentration of 2 percent by weight in water. Subsequent to air drying the two layers simultaneously at 100° C. and monitoring the difference in weight prior to and subsequent to coating, the dried Teslin™ sheet rolls contained 1.5 gram, 15 microns in thickness, of Rhoplex B-15J overcoated with poly(ethylene oxide). Rewinding the coated side of the TESLIN base sheet (roll form) on to an empty core and using these rolls, # the uncoated side of the TESLIN base sheet were coated on a Faustel Coater using a one slot die, # with a blend comprised of 80.0 percent by weight of polymethyl acrylate trimethyl ammonium chloride latex, such as HX42-1, available from Interpolymer Corp. and 20.0 percent by weight of poly (ethylene oxide), POLY OX WSRN-3000, available from Union Carbide Corporation, which blend was present in a concentration of 10 percent by weight in water. # Subsequent to air drying at 100° C. and monitoring the difference in weight prior to and subsequent to coating, the dried Teslin™ base sheet rolls contained 0.4 gram, 5 microns in thickness of the polymethyl acrylate trimethyl ammonium chloride latex, and poly (ethylene oxide) blend. The coated backing sheets were cut from this roll in 8.5×11.0" cut sheets.

Preparation of the xerographic images on transparencies containing coating 99:

20 sheets of Fuji Xerox COLOR OHP Transparency were fed into a Fuji Xeroxcolor copier and images were obtained having optical density values of 1.20 (cyan), 1.15 (magenta), 0.77 (yellow) and 1.35 (black).

Lamination of imaged transparencies containing coating 101 with the backing sheets containing coating 100/102:

The imaged side of the Fuji Xerox COLOR OHP Transparency was brought in contact with the poly(ethylene oxide) side of the coated backing sheet and laminated together at 140° C. and a pressure of 100 psi for 2 minutes in a Model 7000 Laminator from Southwest Binding Systems, Ontario, Canada. The laminated structure of transparency and plastic had a gloss of 140 units, and optical density values of 1.35 (cyan), 1.23 (magenta), 0.89 (yellow) and 1.58 (black). These images were waterfast when washed with water for 2 minutes at 50° C. and lightfast for a period of three months without any change in their optical density.

EXAMPLE IV

Preparation of two layered adhesive/toner wetting coating 100/102 for adhering backing sheets to imaged transparent substrates using one coating step:

Twenty opaque coated backing sheets were prepared by the solvent extrusion process (single side each time initially) on a Faustel Coater using a two slot die, by providing for each an opaque Mylar™ base sheet (roll form) with a thickness of 100 microns and coating the base sheet simultaneously with two hydrophobic polymeric layers where the first layer in contact with the substrate was comprised of a blend containing 90 percent by weight of poly(2-ethylhexyl methacrylate), such as #229, available from Scientific Polymer Products, 5 percent by weight of the antistat 2-methyl-3-propyl benzothiazolium iodide Aldrich 36,329-4), 3 percent by weight of UV absorbing compound poly[2-(4-benzoyl-3-hydroxyphenoxy)ethylacrylate ](Cyasorb UV-2126, #41,323-2, available from Aldrich chemical company),and 2 percent by weight of an antioxidant compound 2,6-ditert-butyl-4-(dimethylaminomethyl)phenol (Ethanox 703, #41,327-5, available from Aldrich chemical company), # present in a concentration of 10 percent by weight in toluene. The second layer in contact with the first layer was a polymer having excellent image-wetting properties such as epichlorohydrin-ethylene oxide copolymer such as #155 available from Scientific Polymer Products present in a concentration of 2 percent by weight in toluene. Subsequent to air drying the two layers simultaneously at 100° C. and monitoring the difference in weight prior to and subsequent to coating, # the dried Opaque Mylar™ rolls contained 1.5 gram, 15 microns in thickness, # of poly(2-ethylhexyl methacrylate) overcoated with epichlorohydrin-ethyleneoxide copolymer. The coated backing sheets were cut from this roll in 8.5×11.0" cut sheets.

Preparation of the xerographic image on transparencies containing coating 99:

Twenty sheets of Fuji Xerox COLOR OHP Transparency were fed into a Fuji Xeroxcolor copier and images were obtained having optical density values of 1.20 (cyan), 1.15 (magenta), 0.77 (yellow) and 1.35 (black).

Lamination of images on transparencies containing coating 99 with the backing sheets containing coating 100/102:

The imaged side of the Fuji Xerox COLOR OHP Transparency was brought in contact with the epichlorohydrin-ethyleneoxide copolymer side of the coated backing sheet and laminated together at 140° C. and a pressure of 100 psi for 2 minutes in a Model 7000 Laminator from Southwest Binding Systems, Ontario, Canada. The laminated structure of transparency and plastic had a gloss of 130 units, and optical density values of 1.35 (cyan), 1.23 (magenta), 0.89 (yellow) and 1.58 (black). These images were waterfast when washed with water for 2 minutes at 50° C. and lightfast for a period of three months without any change in their optical density.

Other embodiments and modifications of the present invention may occur to those skilled in the art subsequent to a review of the information presented herein, these embodiments and modifications, as well as equivalents thereof, are also included within the scope of this invention.

What is claimed is:

1. A method of creating simulated photographic-quality prints including the steps of:

providing a coated transparent substrate having a wrong reading, color toner image formed thereon;

providing a backing member, at least one of two surfaces of which is provided with a coating including a lightfastness inducing material for protecting color toner images from degradation in the presence of UV light; and adhering said backing member to said transparent substrate.

2. The method according to claim 1 wherein said lightfastness inducing material comprises an UV absorber and an antioxidant.

3. The method according to claim 1 wherein said lightfastness inducing material is selected from the group consisting of 2-(4-benzoyl-3-hydroxyphenoxy)ethylacrylate; 1,2-hydroxy-4-(octyloxy)benzophenone; poly(2-(4-benzoyl-3-hydroxyphenoxy) ethylacrylate); hexadecyl-3,5-di-tert-butyl-4-hydroxybenzoate; poly(N,N-bis(2,2,6,6-tetramethyl-4-piperidinyl)- 1,6-hexane diamine-co-2,4-dichloro-6-morpholino- 1,3,5-triazine); 2-dodecyl-N-(2,2,6,6-tetramethyl-4-piperidinyl)succinimide; 2-dodecyl-N-(1,2,2,6,6-pentamethyl-4-piperidinyl)succinimide; N-(1-acetyl-2,2,6,6-tetramethyl-4-piperidinyl)-2-dodecylsuccinimide; 1-(N-(poly(3-allyloxy-2-hydroxypropyl)-2-aminoethyl)-2-imidazolinone; poly(2-ethyl-2-oxazoline); 2,2'-methylenebis(6-tert-butyl-4-methylphenol); 2,2'-methylenebis(6-tert-butyl-4-ethylphenol); tris(4-tert-butyl-3-hydroxy-2,6-dimethylbenzyl) isocyanurate; didodecyl-3,3'-thiodipropionate; ditridecyl-3,3'-thiodipropionate; ditetradecyl-3,3'-thiodipropionate; dioctadecyl-3,3'thiodipropionate; 1,3,5-trimethyl-2,4,6-tris(3,5-di-tert-butyl-4-hydroxybenzyl)benzene; and 2,6-ditert-butyl-4-(dimethyl aminomethyl) phenol.

* * * * *